(12) United States Patent
Mueller et al.

(10) Patent No.: US 6,473,949 B1
(45) Date of Patent: Nov. 5, 2002

(54) METHOD FOR PRODUCING ARTICULATED JOINTS

(75) Inventors: Atndt Mueller, Wuppertal (DE); Uwe Gohrbandt, Haan (DE); Victor Otte, Solingen (DE); Ralf Otte, Weinheim (DE)

(73) Assignee: Ed. Scharwaechter GmbH, Remscheid (DE)

( * ) Notice: Subject to any disclaimer, the term of this patent is extended or adjusted under 35 U.S.C. 154(b) by 0 days.

(21) Appl. No.: 09/700,641

(22) PCT Filed: May 15, 1999

(86) PCT No.: PCT/DE99/01475

§ 371 (c)(1),
(2), (4) Date: May 7, 2001

(87) PCT Pub. No.: WO99/59771

PCT Pub. Date: Nov. 25, 1999

(30) Foreign Application Priority Data

May 18, 1998 (DE) .......................... 198 22 204

(51) Int. Cl.$^7$ .................. B23Q 17/00; B21D 53/40
(52) U.S. Cl. .............. 29/11; 29/407.05; 29/407.09
(58) Field of Search ................ 29/11, 407.05, 29/409.09, 702

(56) References Cited

U.S. PATENT DOCUMENTS

| | | | | |
|---|---|---|---|---|
| 4,141,123 A | * | 2/1979 | Newlon | 29/11 |
| 4,730,379 A | * | 3/1988 | Chen | 29/11 |
| 5,377,396 A | * | 1/1995 | Moran, Jr. | 29/11 |

FOREIGN PATENT DOCUMENTS

| | | |
|---|---|---|
| DE | 260179 A3 | 7/1986 |
| DE | 4102899 A1 | 8/1991 |
| DE | 19522503 A1 | 1/1997 |
| EP | 0317539 A2 | 5/1989 |
| EP | 0499443 A2 | 8/1992 |
| JP | 05192846 | 1/1992 |

* cited by examiner

*Primary Examiner*—David P. Bryant
(74) *Attorney, Agent, or Firm*—Davidson, Davidson & Kappel, LLC

(57) ABSTRACT

The invention relates to a method for producing articulated joints by assembling prefabricated parts, which comprise a pin defining an axis on which at least one articulated part having a bearing hole is to be pivotally mounted by means of a bearing bush. The parts are randomly delivered and, if required, automatically processed in a machine to assemble the joints. Cost-effective production of articulated joints with freely adjustable torques using automatic can be achieved machines by carrying out the following steps: determining the actual dimensions of the bearing holes, the pin and at least one of the two bearing bushes; comparing the determined actual dimensions and the values derived therefrom, especially the ratios, with the threshold values that can be fixed in order to obtain the desired result and inputting control commands into the automatically working machine with the purpose of processing at least one of the parts before assembling the latter.

15 Claims, 1 Drawing Sheet

METHOD FOR PRODUCING ARTICULATED JOINTS

FIELD OF THE INVENTION

The present invention relates to a method for producing joints by assembling prefabricated parts comprising a pin which defines an axis and on which at least one part which is to be articulated and has a bearing socket can be mounted pivotably by means of a bearing bushing, in which the parts are delivered randomly and are automatically machined and assembled on a machine to form joints as required.

BACKGROUND INFORMATION

It is known from practice to put together hinges which are equipped with a bearing arrangement by means of bushings made of maintenance-free bearing material, in particular for motor-vehicle doors, in such a manner that a bearing hole, forming a gudgeon, in one hinge half is lined with bearing bushings, which are preferably designed as collar-type bushings and are made of maintenance-free bearing material, and subsequently a hinge joint pin forming the joint axis driven into the bearing hole lined with the bearing bushings. In this case, the hinge joint pin has a certain oversize, as compared with the clear diameter of the bearing bushes inserted into the bearing hole, resulting in a certain pivoting moment of the joint being established. Since the pivoting moment fluctuates as a function of the sum of the tolerances of the individual parts, the manufactureing of a joint or of a hinge with a pivoting moment only fluctuating within narrow limits requires complicated, manual sorting and measuring or highly precise manufacturing, which is not economical for mass products.

Furthermore, it is known from the practice of inserting bearing bushings into bearing holes, for example of a gudgeon, to introduce the bearing bushings into the bearing hole by means of a calibrating mandrel. The same calibrating mandrel is always provided for this, regardless of any tolerances in the bearing hole or in the wall thickness of the bearing bushings, with the result that a pivoting moment, fluctuating within wide limits, of the joints or of the hinges is still produced, in particular due to the tolerances of the pin to be inserted. This fluctuation is undesirable and in series manufacturing results in an increased outlay in terms of sorting before or after the joints are assembled.

It is furthermore known from practice, for the production of hinges, to design the hinge pin itself as a calibrating mandrel and to equip it, at its end lying in front in the driving-in direction, with a shape which facilitates the calibrating of the bearing bushes, for example with a press-on edge and/or with a smoothing partially spherical shape. Although this measure can assist in standardising the resulting pivoting moment, it is not possible to influence the pivoting moment in a targeted manner in series manufacturing or even to configure it such that it deviates from the standardised moment. Furthermore, for the hinge pin which is provided once as mandrel this method requires additional machining of the tip of the pin and generally also a stronger material than is absolutely necessary for its actual function, which means that this method is not very economical.

SUMMARY OF THE INVENTION

It is an object of the invention to specify a method for producing joints, in particular rotating or pivoting joints, such as hinges for motor-vehicle doors, with which method joints having moments which can be set as desired can be manufactured cost effectively on automatically operating machines.

According to the present invention, this object is achieved in the case of the method mentioned at the beginning by the steps—determining the actual dimensions of the bearing socket, pin and at least one of the two bearing bushings; comparing the actual dimensions determined and values derived therefrom, in particular ratios, with threshold values which can be preset with regard to an intended result; and issuing control commands to the automatically operating machine with regard to the machining of at least one of the parts before assembling the parts.

The method according to the present invention makes it possible to assemble joints from the prefabricated parts in such a manner that the delivered parts are put together in each case preferably without prior sorting and commissioning, it being possible for an optionally required machining of the parts to take place as required, the desired dimension predetermined for the machining already being selected with regard to the desired moment or the desired rotational or pivoting resistance of the joint. By this means—if required—each joint can be produced with a very small moment tolerance, as a result of which, for example in the case of hinges which are produced in large series, for example for motor-vehicle doors, a uniformly good and reproducible quality is obtained. Moreover, the reject quota drops, since because of the targeted machining it is also possible for those parts to be put together to form functioning hinges which already lie outside the manufacturing tolerance of the respectively prefabricated parts. Prior sorting of the parts, which is costly in terms of time and space when the parts are delivered randomly, is not required.

The actual dimensions which are to be determined in the first step of the method are preferably the internal hole diameter, the wall thickness of the bearing bushings and the diameter of the joint pin. These actual dimensions are set in a ratio, with decisive values for obtaining a desired moment, for example pivoting movement, in particular with an oversize or undersize of the calibrated, clear width of the bearing bushes inserted into the bearing hole, in relation to the actual dimension of the diameter of the joint pin, so as to ensure at least one precisely dimensioned oversize or undersize of the clear diameter of the bearing bushings inserted into the bearing hole, as compared with the associated joint pin diameter, taking into consideration the possibly present, positive or negative tolerance sums. The method according to the present invention therefore makes it possible to stipulate a desired pivoting moment, it being possible, moreover, to change the stipulation without further interventions into the production process.

In an advantageous development for the practical implementation of the above described method, it can also be provided that in a further step of the method, which is added in between the first and the second steps of the method, the actual dimensions which have been determined in the first step of the method are compared with the respectively permitted tolerances, which in many cases can facilitate the pinpointing of the clear diameter of the calibrated bearing bushings, which diameter is required for obtaining a certain pivoting moment, and therefore of the calibrating mandrel which is to be used for this purpose and is present in the machine, or can be expedient in the interest of increasing the reliability with which the most suitable calibrating mandrel is pinpointed and used.

It is preferably provided that with regard to the dimensioning of the clear diameter of the calibrated bearing bushings, which diameter is to be set in a ratio with respect to the actual diameter of the joint pin in order to obtain a certain pivoting moment, an addition or reduction is provided as a function of the wall thickness of the bearing bushings.

Although there are absolute amounts with regard to the criteria which are decisive for obtaining a desired pivoting moment, the absolute determination and maintaining of the said amounts would require a non-acceptable outlay. Therefore, in a further refinement of the invention, it is proposed that the values which have been determined in the two first steps of the method are compared with an empirical value or a static value decisive for obtaining a certain pivoting moment of the pivoting joint, and that so called neuronal networks are used for determining an empirical value which is decisive for obtaining a certain pivoting moment of the pivoting joint. The empirical value here is understood to be that range of possible combinations in the ratio of the bushing wall thickness and clear diameter of the calibrated bushing to a given diameter of the hinge pin, within which the maintaining of a desired pivoting moment can still be ensured with sufficient accuracy.

Obtaining the knowledge of the effect of the individual criteria and of the influence of individual criteria for increasing or decreasing the pivoting moment preferably takes place with the use of learning electronic circuits or computers which, with reference to a number or multiplicity of measured starting values of a number of parts and with reference to the pivoting moment resulting during the joining together of these parts, determine a statistical empirical value resulting in maintaining a predetermined pivoting moment. This simplifies the design of the device or automatically operating machine to be used for implementing the method according to the present invention, and also the outlay on installation which is required for the operation thereof to the effect that device or machine can automatically adapt the variations resulting from various sizes of a pivoting joint or hinge and therefore the variations resulting from different sizes of hinge pins and bearing sockets into the decisive criteria for maintaining a uniform, predetermined pivoting moment.

According to a preferred development of the present invention, provision is made for control commands which are issued to the automatically operating machine to predetermine the extent of the deformation of the bearing bushings, the control commands issued by the control device to the automatically operating machine each relating to the selection of a machining tool and/or to the control of its power capacity, in particular to the effect that the control command issued to the automatically operating machine relates to the selection of a calibrating mandrel for calibrating the bearing bushings.

The automatically operating machine advantageously has a set of a plurality of calibrating mandrels of differing diameter which can be selectively put into use as a function of the actual dimensions which have been determined for the parts which are to be joined together in each case to form a joint.

In this connection, the selection of the calibrating mandrel diameter takes place as a function of the actual dimension determined for the joint pin, the clear diameter of the calibrated bearing bushings having a certain and constantly uniform undersize as compared to the respectively given joint pin diameter.

Accordingly, the bushings are calibrated in each case with a characteristic undersize, for obtaining a desired pivoting moment, as compared to the actual dimension which has been determined for the joint pin, which, with bearing bushings consisting at least partially of a material which is capable of recovering its shape or of a memory material, can also be achieved by the fact that if, for the bearing arrangement of the joint pin, bushings consisting at least partially of a material which is capable of recovering its shape are used, the bearing bushes are calibrated with an oversize, characteristic for obtaining a desired pivoting moment, as compared to the actual dimension which has been determined for the joint pin. In this connection, the actual clear diameter of the bearing bushings can be used within a period of 20 or more seconds after the calibrating measure as the decisive variable for the clear width of the bearing bushings which is to be calibrated.

DETAILED DESCRIPTION

Figure 1:
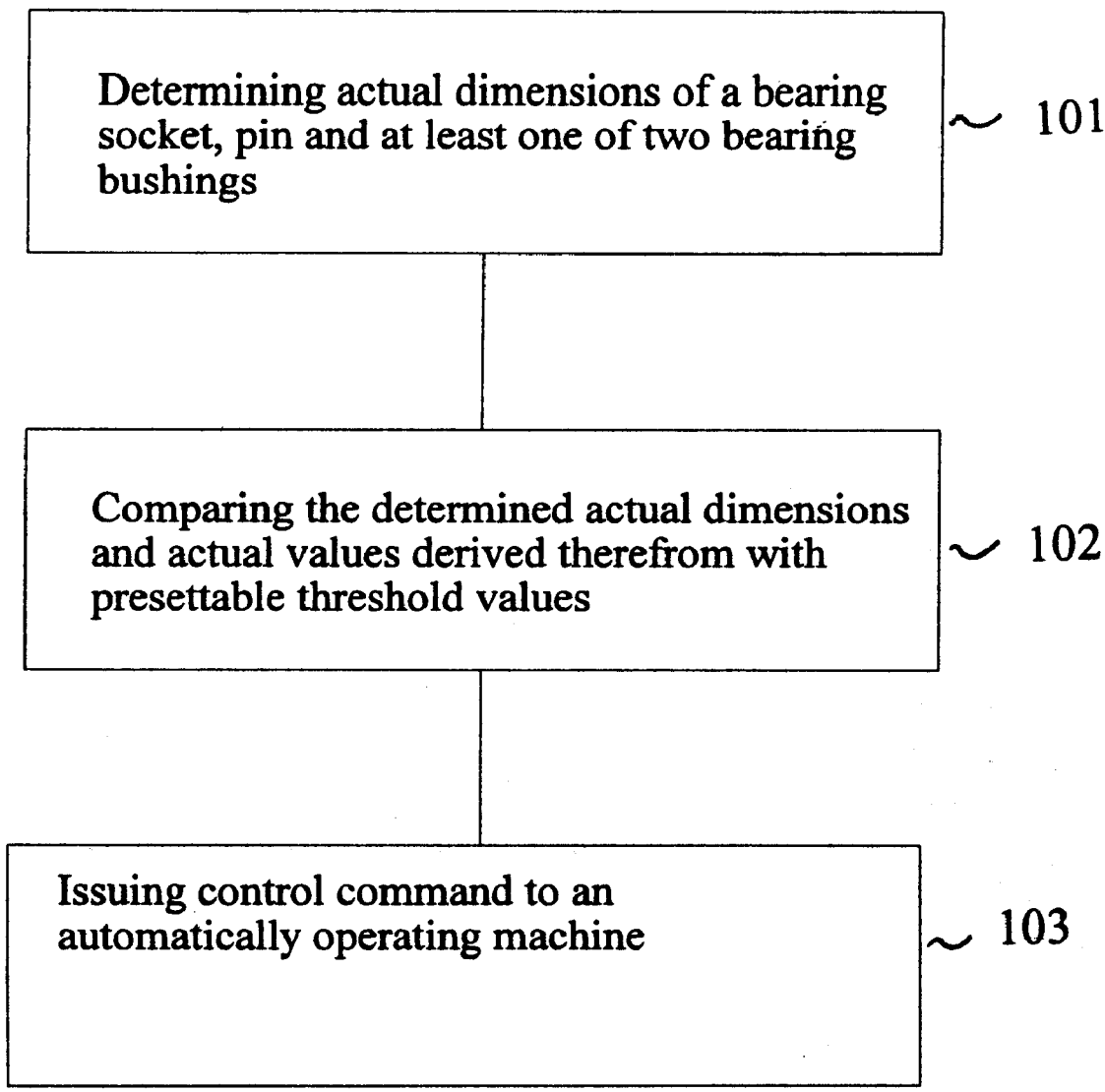
FIG. 1 shows a flowchart of the method of the present invention.

FIG. 1 shows a flowchart of the method of the present invention. In step 101, the actual dimension of the bearing sockets are determined. In step 102, actual determined dimensions are compared with threshold values. In step 103, control commands are issued to automatically operating machine.

What is claimed is:

1. A method for producing joints by assembling prefabricated parts comprising a pin which defines an axis and on which at least one part which is to be articulated and has a bearing socket can be mounted pivotably using a bearing bushing, in which the parts are delivered randomly and are automatically machined and assembled on a machine to form joints, comprising the steps of:

determining actual dimensions of the bearing socket, pin and at least one of the two bearing bushings;

comparing the actual dimensions determined and values derived therefrom, in particular ratios, with threshold values which can be preset with regard to an intended result; and issuing control commands to the automatically operating machine with regard to the machining of at least one of the parts before assembling the parts.

2. The method according to claim 1, wherein after the actual values are determined, the latter are furthermore compared with tolerances which are permitted in each case.

3. The method according to claim 1, wherein the threshold values with which the actual values are compared are preset, starting from known dimensions of assembled joints, by stored empirical values for an attaining of a certain rotational resistance.

4. The method according to claim 3, wherein the empirical values are determined using a neuronal network and are then stored.

5. The method according to claim 1, wherein control commands determining the extent of deformation of the bearing bushings are issued to the automatically operating machine.

6. The method according to claim 1, wherein the control commands which are issued by the control device to the automatically operating machine each relate to the selection of a machining tool and its power capacity.

7. The method according to claim 1, wherein the control commands issued to the automatically operating machine relate to a selection of a calibrating mandrel for calibrating the bearing bushings.

8. The method according to claim 1, wherein the automatically operating machine comprises a plurality of calibrating mandrels of differing diameter, the selection of a certain calibrating mandrel taking place as a function of the actual pin dimension determined for the parts which are to be joined together in each case to form a joint.

9. The method according to claim 1, wherein the bushings are calibrated to a desired dimension, which, as compared with the actual dimension which has been determined for the pin, corresponds to a suitable, characteristic undersize with regard to one of the desired moment and the desired resistance.

10. The method according to claim 9, wherein the undersize of the calibration of the bushing as compared with the actual dimension of the pin is determined in such a manner that a calibrated bushing diameter is always assigned an amount for simultaneously taking into consideration the bushing wall thickness, which is selected in accordance with the statistical distribution.

11. The method according to claim 1, wherein the material of which the bearing bushings at least partially consist is selected from the group comprising materials capable of recovering their shape and memory material.

12. The method according to claim 11, in which a clear diameter of the bushing of material capable of recovering its shape is calibrated, as compared with the actual dimension which has been determined for the pin, with a characteristic oversize for obtaining a desired moment, wherein the oversize is selected in such a manner that an intentional undersize as compared to the actual dimension of the pin is obtained after a predetermined period from the shape recovery of the bearing bushing.

13. The method according to claim 1, wherein the joint produced is a rotating joint.

14. The method according to claim 1, wherein the joint produced is a pivoting joint.

15. The method according to claim 1, wherein the joint produced is a motor-vehicle hinge.

* * * * *